United States Patent
New et al.

(10) Patent No.: US 7,242,321 B2
(45) Date of Patent: Jul. 10, 2007

(54) KEY FOB WITH DIRECTIONAL VEHICLE LOCATOR

(75) Inventors: David New, Ann Arbor, MI (US); Keith B Carle, Howell, MI (US); Neil L Borkowicz, Plymouth, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 213 days.

(21) Appl. No.: 11/115,614

(22) Filed: Apr. 27, 2005

(65) Prior Publication Data

US 2006/0244574 A1 Nov. 2, 2006

(51) Int. Cl.
*G08G 1/123* (2006.01)

(52) U.S. Cl. ............ 340/988; 340/539.11; 340/426.22; 342/357.07; 342/457; 701/200; 701/302

(58) Field of Classification Search ........... 340/426.22, 340/426.36, 988, 989, 995.26, 995.27, 539.11; 342/357.07, 457; 701/200, 302
See application file for complete search history.

(56) References Cited

U.S. PATENT DOCUMENTS

| | | | |
|---|---|---|---|
| 4,908,629 A | | 3/1990 | Apsell et al. |
| 6,363,324 B1 | * | 3/2002 | Hildebrant .................. 701/213 |
| 6,405,125 B1 | * | 6/2002 | Ayed .......................... 701/200 |
| 6,489,921 B1 | * | 12/2002 | Wilkinson ............. 342/357.08 |
| 6,529,142 B2 | * | 3/2003 | Yeh et al. ................... 340/988 |
| 6,791,477 B2 | * | 9/2004 | Sari et al. ................... 340/989 |
| 6,909,964 B2 | * | 6/2005 | Armstrong et al. ......... 340/989 |

\* cited by examiner

*Primary Examiner*—Jeffery Hofsass
*Assistant Examiner*—Samuel J Walk
(74) *Attorney, Agent, or Firm*—Ralph E. Smith

(57) ABSTRACT

A system for locating a vehicle includes a hand-held unit with data transceiver operation to generate a location request signal. The system also includes a location element in the vehicle, which is operative upon receipt of the location request signal to determine a location of the vehicle relative to the hand-held unit. The locator element in the vehicle sends an indication of the location to the vehicle. The data transceiver in the hand-held unit is further operative to receive the indication of the location of the vehicle and to send the indication to a location indicator. Upon receipt of the indication of the location, the location indicator alerts an operator of the hand-held unit.

16 Claims, 3 Drawing Sheets

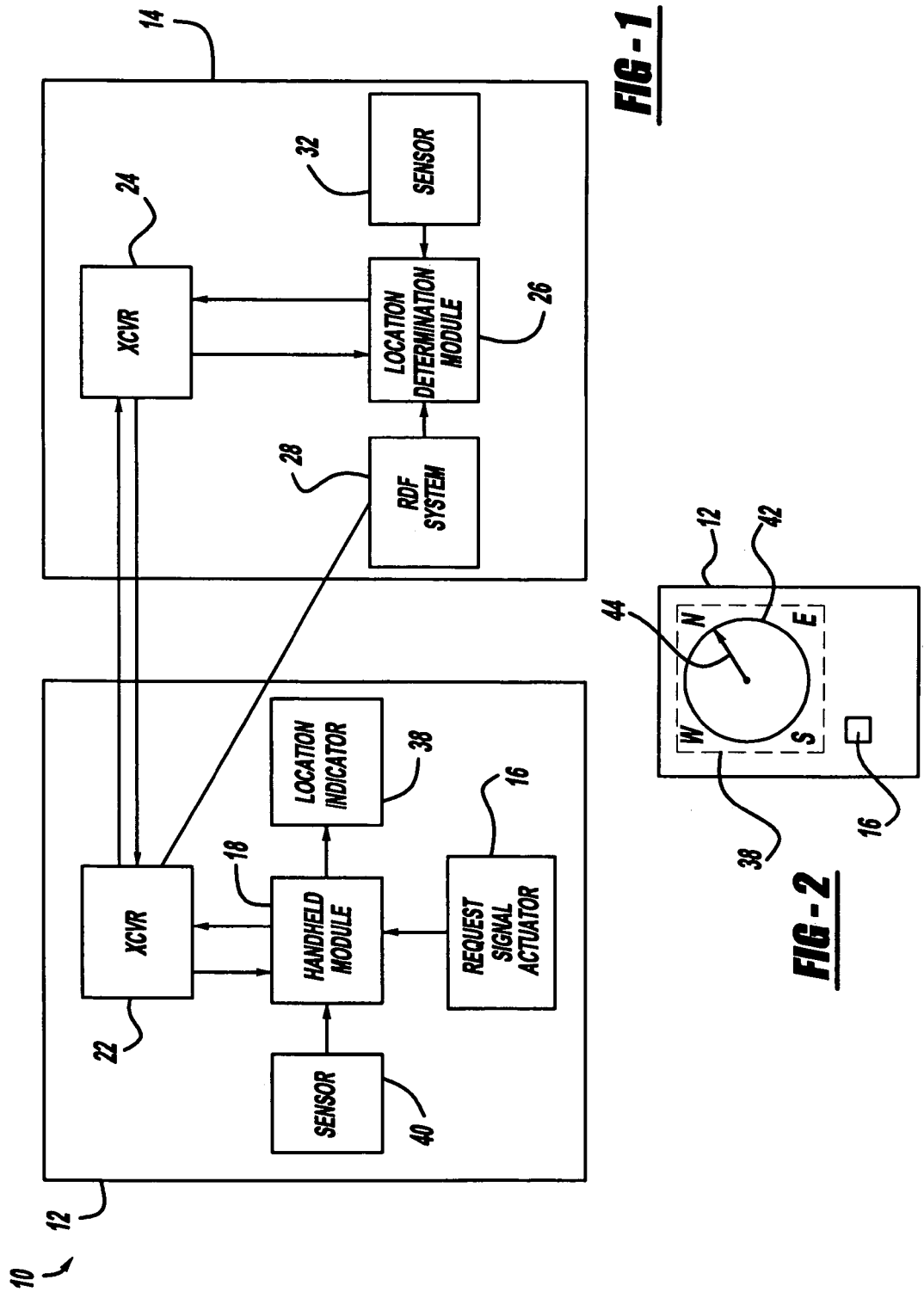

KEY FOB WITH DIRECTIONAL VEHICLE LOCATOR

FIELD OF THE INVENTION

The present invention relates to a system and method to locate a vehicle using a hand-held unit and a vehicle locator element in the vehicle.

BACKGROUND OF THE INVENTION

Many vehicles on the road today are equipped with a remote keyless entry (RKE) system. Many RKE systems allow a user to alarm a vehicle against theft, lock and unlock the doors and trunk, remote start the vehicle, etc. The RKE system mainly includes a key fob transmitter and a receiver inside the vehicle.

Current RKE systems allow a user to initiate an action in the vehicle using the transmitter in a key fob, which transmits data to the receiver in the vehicle. The user presses a pushbutton switch on his RKE key fob to initiate a request, and radio frequency (RF) signal. The request wakes up a key fob computer-processing unit (CPU) inside the key fob, which sends a data stream to the transmitter. Next, the receiver in the vehicle captures the RF signal, and sends the data stream to a vehicle CPU, which decodes it and sends commands to a command module.

While RKE systems allow vehicle operators to interact with their vehicle for remote start and lock/unlock features, current RKE systems do not allow vehicle operators the ability to interact with the vehicle in order to determine a location of the vehicle.

SUMMARY OF THE INVENTION

The present invention provides a system for locating a vehicle that includes a hand-held unit with data transceiver operative to generate a location request signal and a location indicator for alerting an operator of the hand-held unit of a vehicle location. Additionally, the system includes a location element in the vehicle operative upon receipt of the location request signal to determine a location of the vehicle relative to the hand-held unit and to send an indication of the location of the vehicle to the hand-held unit. The data transceiver in the hand-held unit is also operative to receive the indication of the location of the vehicle and send the indication to the location indicator of the hand-held unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic diagram of a system used to find a location of a vehicle relative to a hand-held unit.

FIG. 2 is a diagram of a hand-held unit with an exemplary location indicator and a pressure activated push button switch.

DETAILED DESCRIPTION OF THE PREFERRED EMBODIMENTS

Figure 3A:
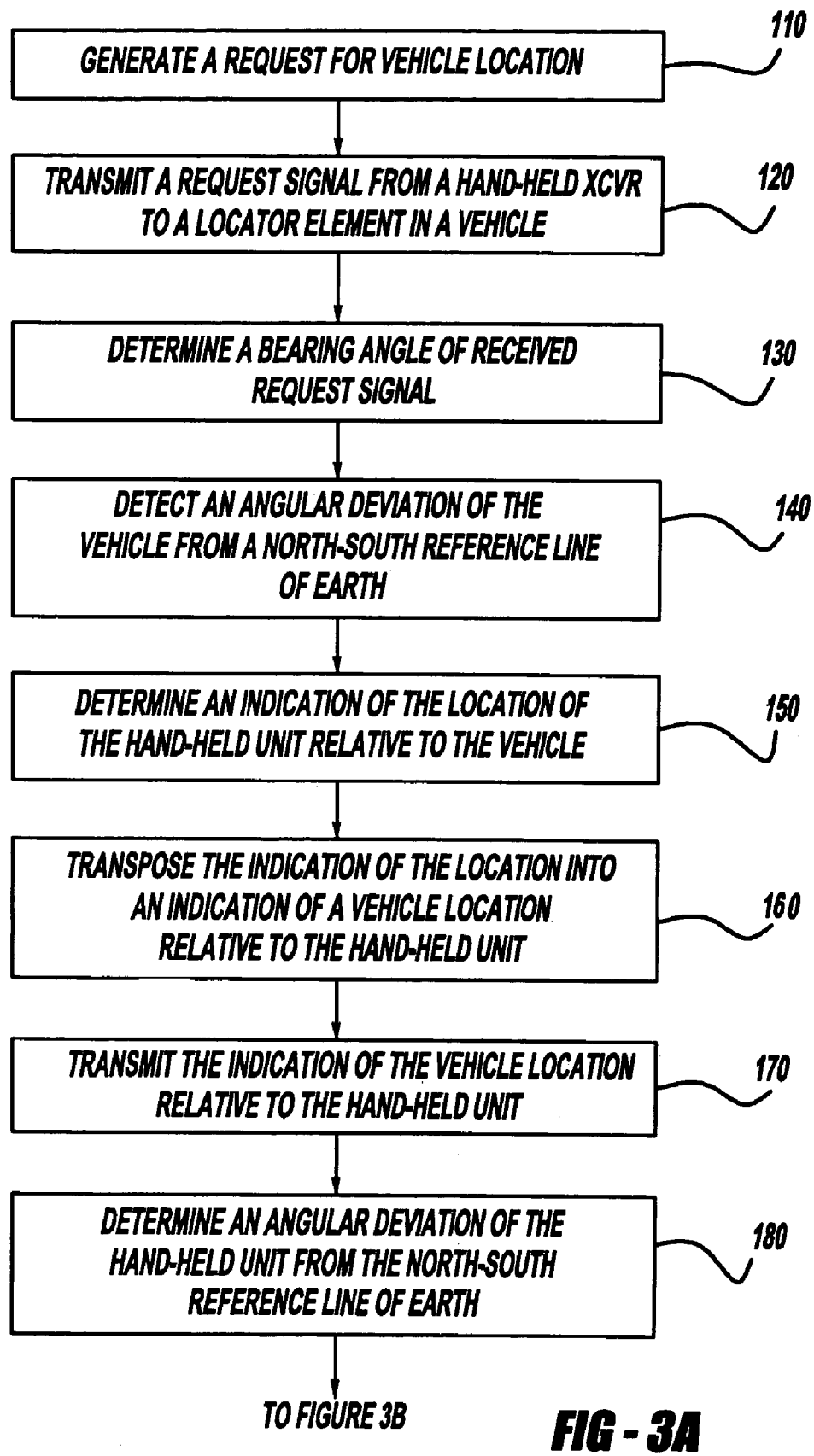
FIG. 3 is a block diagram of a process used to find a location of a vehicle relative to a hand-held unit.

The following description is merely exemplary in nature and is in no way intended to limit the invention, its application or uses.

FIG. 1 depicts a system 10 for locating a vehicle. The system 10 includes a hand-held unit 12 and a location element 14 in the vehicle. The hand-held unit 12 includes a request signal actuator 16 and a hand-held module 18. The request signal actuator 16, such as a pressure activated pushbutton switch, is coupled to the hand-held module 18. An operator (not shown) of the hand-held unit 12 depresses the pushbutton switch 16 and initiates a request signal to locate the vehicle. Upon receiving the operator-initiated request signal, the hand-held module 18 sends the request signal for location of the vehicle via a transceiver 22 of the hand-held unit 12 to the location element 14 in the vehicle.

The location element 14 includes a vehicle transceiver 24, a location determination module 26, a radio directional finding (RDF) system 28 and a vehicle sensor 32. Once the hand-held unit 12 transmits the request signal for location of the vehicle, the location element 14 receives the request signal for location of the vehicle via the vehicle transceiver 24. The vehicle transceiver 24 is coupled for transmitting the request signal to the location determination module 26. Additionally, the radio directional finding (RDF) system 28 is coupled to the location determination module 26 and conducts a radio directional finding operation on the request signal. The radio directional finding operation includes determining a bearing angle of the request signal received from the hand-held unit 12. The bearing angle is an angular direction of the request signal received relative to the vehicle via the RDF system 28. Once the bearing angle is computed, the RDF system 28 sends the bearing angle of the request signal to the location determination module 26. The RDF system 28 includes a Doppler radio directional finding system. The Doppler radio directional finding system includes a radio direction finding system using a Doppler array of antennas.

In addition to receiving the bearing angle from the RDF system 28, the location determination module 26 is coupled to a vehicle sensor 32, such as a flux-gate compass, for receipt of an angular deviation of the vehicle. The vehicle sensor 32 detects the angular deviation of the vehicle from a north-south reference line of earth, such as a true north-south or magnetic north-south reference line. Using the angular deviation and the bearing angle of the request signal from the hand-held unit 12, the location determination module 26 determines an indication of a location of the hand-held unit 12 relative to the vehicle.

Once the indication of the location is determined, the location determination module 26 sends the indication of the location to the vehicle transceiver 24 for transmitting to the hand-held unit 12. The transceiver 22 of the hand-held unit 12 receives the indication of the location of the hand-held unit 12 relative to the vehicle and sends the indication to the hand-held module 18. Upon receiving the indication, the hand-held module 18 sends the indication to a location indicator 38, such as an LCD display unit, which alerts the operator of the hand-held unit 12 of the indication.

Additionally, a hand-held sensor 40, such as a flux-gate compass, is coupled to the hand-held module 18. The hand-held sensor 40 determines an angular deviation of the hand-held unit 12 from the north-south reference line of earth and sends the angular deviation of the hand-held unit 12 to the hand-held module 18. The hand-held sensor 40 and the vehicle sensor 32 must reference to the same north-south reference line such that the indication of the location is accurately presented to the operator. Additionally, in order to accurately determine the angular deviation of the hand-held unit 12, the hand-held unit 12 must be held horizontal and level to ground such that a back of the hand-held unit 12 is held downward with a face or front of the hand-held unit 12 directed upward.

In addition to alerting the operator of the indication of the location of the vehicle, the location indicator 38 alerts the operator of the hand-held unit 12 of the angular deviation of the hand-held unit 12. The hand-held module 18 sends the angular deviation of the hand-held unit 12 to the location indicator 38 to alert the operator of the direction in which the hand-held unit 12 is pointed. Referring to FIG. 2, the location indicator 38 displays the angular deviation of the hand-held unit 12 using a floating compass dial 42 that rotates, indicating a directional location of the hand-held unit 12 relative to the north-south reference line of earth. The location indicator 38 utilizes an arrow 44 to display the indication of the location to the operator of the hand-held unit 12. Therefore, although the floating compass dial 42 may rotate due to a change in the angular deviation of the hand-held unit 12, the indication of the location or the arrow 44 may not indicate a change in direction. However, if the angular deviation of the vehicle or the bearing angle of the request signal received by the vehicle changes or alters, then the hand-held unit 12 displays a recomputed indication of the location.

For example, if the indication of the location is determined as a south-west direction and the hand-held unit 12 is pointing in a north direction, the floating compass dial 42 displays a reading of north at a top of the hand-held unit 12 with the arrow 44 pointed in the south-west direction. If the user changes a direction of the hand-held unit 12 such that the hand-held unit 12 is pointing in a south direction, the hand-held sensor 40 will detect a new angular deviation of the hand-held unit 12. Next, the hand-held module 18 will receive and send the new angular deviation for the hand-held unit 12 to the location indicator 38. The location indicator 38 will then display the new angular deviation using the floating compass dial 42 such that the floating compass dial 42 indicates the south direction at the top of the hand-held unit 12. The indication of the location, however, remains the same, since neither the angular deviation of the vehicle nor the bearing angle of the request signal received by the vehicle changed. Therefore, the arrow 44 remains pointed in the south-west direction, while the floating compass dial 42 displays the south direction or the new angular deviation of the hand-held unit 12. On the other hand, if the angular deviation of the vehicle or the bearing angle of the request signal received by the vehicle alters or changes, the arrow 44 will point to a new directional location on the handheld unit 12 indicating a new indication of the location of the hand-held unit 12 relative to the vehicle.

Prior to alerting the operator of the location, either the hand-held unit 12 or the locator element 14 in the vehicle transposes the indication of the location of the hand-held unit 12 relative to the vehicle such that the operator of the hand-held unit 12 is alerted of an indication of a location of the vehicle relative to the hand-held unit 12.

As used in this description, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 3B:
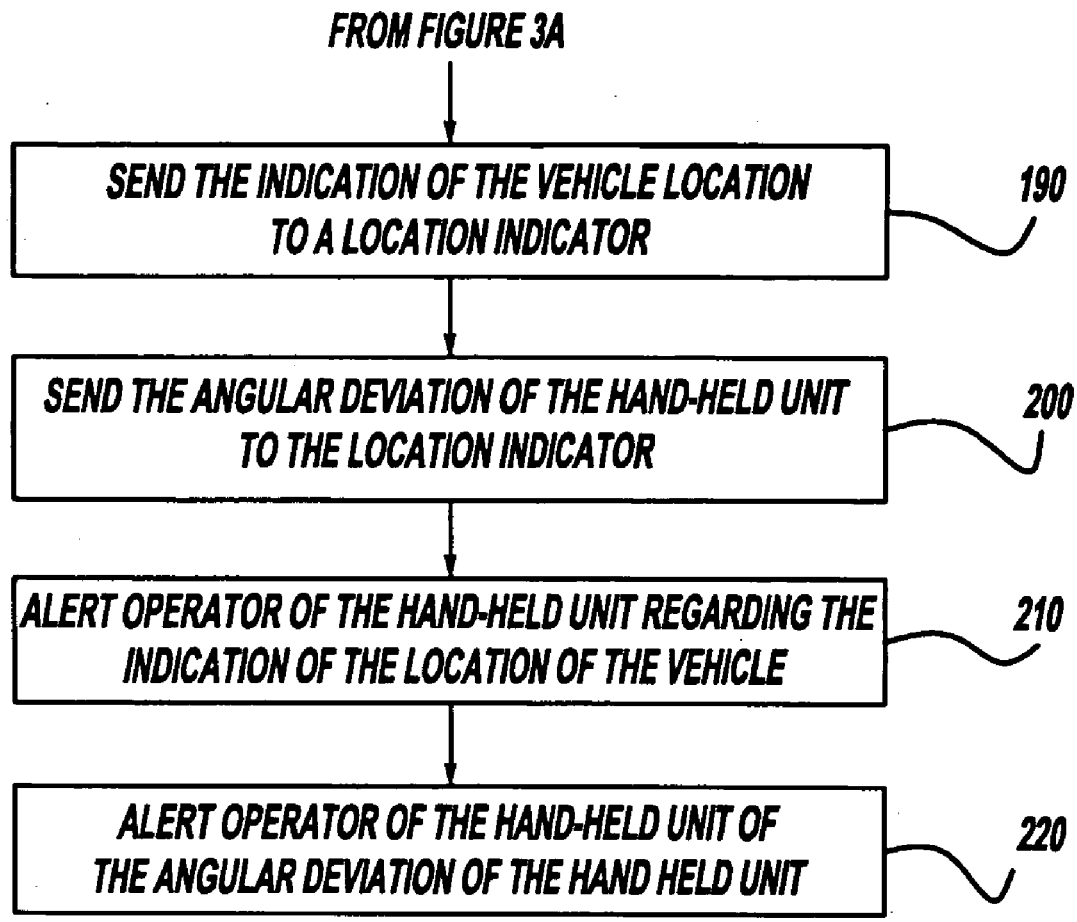

Referring to FIG. 3, an exemplary process 100 for locating a vehicle is discussed in detail. The process 100 begins by an operator of a vehicle generating a request signal for vehicle location at step 110. The request signal is transmitted from a hand-held transceiver to a locator element in the vehicle at step 120. Upon receipt of the request signal, the locator element determines a bearing angle of the request signal based on an angular direction of the request signal sent from the hand-held unit relative to the vehicle at step 130. Additionally, the locator element detects an angular deviation of the vehicle from a north-south reference line of earth, such as a true north-south or magnetic north-south reference line, at step 140. Using the bearing angle of the request signal and the angular deviation of the vehicle, a location determination module determines an indication of a location of the hand-held unit relative to the vehicle, at step 150. Once the location is determined, the indication of the location of the hand-held unit relative to the vehicle is transposed into a new indication of a location of the vehicle relative to the hand-held unit at step 160. The new indication of the location of the vehicle is transmitted to the hand-held unit at step 170.

Additionally, the hand-held unit determines an angular deviation of the hand-held unit relative to the north-south reference line of earth at step 180. Upon receipt of the new indication by the hand-held unit, the new indication is sent to a location indicator associated with the hand-held unit at step 190. The angular deviation of the hand-held unit is also sent to the location indicator at step 200. Using the location indicator, the operator is alerted of the new indication of the location of the vehicle relative to the hand-held unit at step 210. Additionally, the location indicator alerts the operator of the angular deviation of the hand-held unit relative to the north-south reference line at step 220.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for locating a vehicle, the system comprising:
    a hand-held unit with a data transceiver operative to generate a location request signal, a location indicator for alerting an operator of the hand-held unit of a vehicle location;
    a sensor for detecting an angular deviation of the hand-held unit from a north-south reference line of earth; and
    a hand-held module coupled to the sensor for receipt of the angular deviation and operative to sending the angular deviation to the location indicator for alerting the operator of the angular deviation of the hand-held unit;
    a location element in the vehicle operative upon receipt of the location request signal to determine a location of the hand-held unit relative to the vehicle and to send an indication of the location to the hand-held unit; and
    wherein the data transceiver in the hand-held unit is further operative to receive the indication of the location of the hand-held unit and send the indication to a location indicator of the hand-held unit.

2. The system of claim 1 wherein one of the hand-held unit and the location element transposes the indication of the location of the hand-held unit into an indication of a location of the vehicle relative to the hand-held unit.

3. The system of claim 1 wherein the angular deviation of the hand-held unit from the north-south reference line of earth is displayed using the location indicator.

4. The system of claim 1 wherein the angular deviation of the hand-held unit is displayed using a floating compass dial.

5. The system of claim 1 further comprising a request signal actuator coupled to the hand-held module operative for initiating the location request signal when activated by the operator.

6. A system for locating a vehicle, the system comprising:
a hand-held unit with a data transceiver operative to generate a location request signal and a location indicator for alerting an operator of the hand-held unit of a vehicle location;
a location element in the vehicle operative upon receipt of the location request signal to determine a location of the hand-held unit relative to the vehicle and to send an indication of the location to the hand-held unit; a radio directional finding system operative to determine a bearing angle of the location request signal based on an angular direction by which the radio directional finding system received the location request signal; a location determination module coupled to the radio directional finding system for receipt of the bearing angle of the location request signal; and a sensor coupled to the location determination module for detecting an angular deviation of the vehicle relative to a north-south reference line of earth, whereby the location determination module determines the location of the hand-held unit relative to the vehicle based on a function of the angular deviation of the vehicle and the bearing angle of the location request signal; and
wherein the data transceiver in the hand-held unit is further operative to receive the indication of the location of the hand-held unit and send the indication to a location indicator of the hand-held unit.

7. A process for locating a vehicle, the process comprising:
generating request signal for a location of the vehicle from a hand-held unit;
determining an indication of the location of the hand-held unit relative to the vehicle in a location element in the vehicle including detecting an angular deviation of the hand-held unit from a north-south reference line of earth;
sending the indication of the location of the hand-held unit relative to the vehicle to the hand-held unit; and
alerting an operator of the hand-held unit of the indication of the location of the hand-held unit relative to the vehicle.

8. The process of claim 7 further comprising alerting the operator associated with the hand-held unit of the angular deviation of the hand-hold unit from the north-south reference line of earth.

9. The process of claim 8 wherein alerting the operator further comprises displaying the angular deviation of location of the hand-held unit from the north-south reference line of earth as a floating compass dial.

10. The process of claim 7 wherein determining the indication further comprises determining a bearing angle indicating an angular direction of the request signal received by the location element and sent by the hand-held unit.

11. The process of claim 7 further comprising transposing the indication of the location of the hand-held unit relative to the vehicle such that the operator of the hand-held unit is alerted of an indication of a location of the vehicle relative to the hand-held unit.

12. The process of claim 7 wherein alerting the operator further comprises displaying the indication of the location using an arrow to indicate a direction of the vehicle relative to the hand-held unit.

13. A hand-held unit adapted to communicate with a locator element associated with a vehicle, the hand-held unit comprising:
a module with a data transceiver operative to generate a request signal and receive an indication of a location of the hand-held unit relative to the vehicle by the locator element;
a location indicator coupled to the module operative to alert an operator of the indication; and
a sensor coupled to the module operative to detect an angular deviation of the hand-held unit from a north-south reference line of earth.

14. The hand-held unit of claim 13 wherein the location indicator is further operative to alert the operator of the angular deviation of the hand-held unit from the north-south reference line of earth.

15. A hand-held unit adapted to communicate with a locator element associated with a vehicle, the hand-held unit comprising:
a module with a data transceiver operative to generate a request signal and receive an indication of a location of the hand-held unit relative to the vehicle by the locator element, wherein the indication of the location of the vehicle is based on a function of an angular deviation of the vehicle from a north-south reference line of earth and a bearing angle of the angular direction of the request signal received by the vehicle and sent by the hand-held unit; and
a location indicator coupled to the module operative to alert an operator of the indication.

16. The hand-held unit of claim 13 further comprising a request signal actuator coupled to the module operative to initiate the request signal to locate the vehicle.

* * * * *